Figure 1:
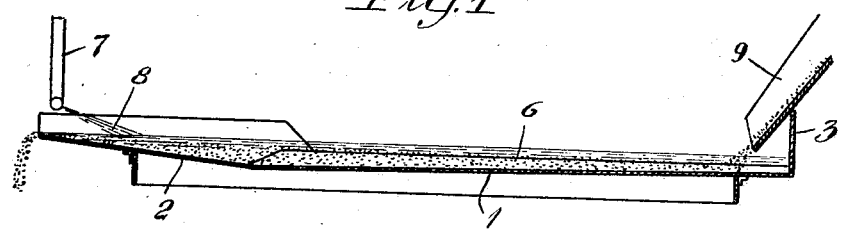

June 24, 1930.                R. SALWÉN ET AL                1,768,215
         MEANS FOR DEHYDRATION OF SUBSTANCES SUSPENDED IN WATER
                            Filed Jan. 26, 1928

R. Salwén and
J. Ohrn
          INVENTORS
By: Marks & Clark
            Attys.

Patented June 24, 1930

1,768,215

UNITED STATES PATENT OFFICE

RAGNAR SALWÉN AND JOHAN ÖHRM, OF GRANGESBERG, SWEDEN, ASSIGNORS TO MORGARDSHAMMARS MEKANISKA VERKSTADS AKTIEBOLAG, OF MORGARDSHAMMAR, SWEDEN, A JOINT-STOCK COMPANY

MEANS FOR DEHYDRATION OF SUBSTANCES SUSPENDED IN WATER

Application filed January 26, 1928, Serial No. 249,754, and in Sweden August 18, 1926.

For the purpose of separating material suspended in water from such water (dehydration of the material), means provided with jolting troughs are advantageously used, in which the suspended material is fed in at the one end of a jolting trough and discharged at the other end, after the material has been separated from the water. The trough is jolted in the direction between the two end portions in question, which form the two short sides of the trough, the latter having preferably a rectangular shape. The bottom of the trough is inclined from the feeding end toward a point at a certain distance from the discharge end, from which point the bottom again slopes upwards toward the last-mentioned end. The portion of the material which is heavier than water is deposited upon the part of the bottom inclined downwards and forwards from the feeding end, and is carried forwards through the jolting movement, until it is brought onto the oppositely sloping fore end, where the material is being packed together. When the material has been packed sufficiently solid and to a sufficient height, the material is moved, by reason of the jolting action, continuously upwards along the oppositely sloping part and is finally discharged at the fore edge of the same.

In the arrangements of this kind as hitherto known, the separated water has been caused to move in a direction opposite to that of the material, and the water has left the trough at the rear end thereof, during the supply of the material. According to the present invention, the means are, instead, devised in such a manner that the water is caused to move over the trough in a direction forming an angle less than 180° with the direction in which the material is moved by reason of the jolting of the trough. The water is then discharged at the side of the trough running longitudinally of the jolting means. This arrangement considerably facilitates the discharge and increases the working capacity of the device in a corresponding degree. The lateral discharge of the water is brought about in the most suitable manner by arranging the bottom of the trough sloping toward the one side.

An important means for the rapid and complete separation of the water also consists in the provision of a conduit for compressed air arranged to open at that end of the trough, or in the proximity thereof, where the dehydrated material is discharged, in such a manner that the air can be pressed out in a direction opposite to that of the water entrained with the material at the surface thereof, whereby said water is driven back, so as not to be entrained with the material discharged.

Figure 2:
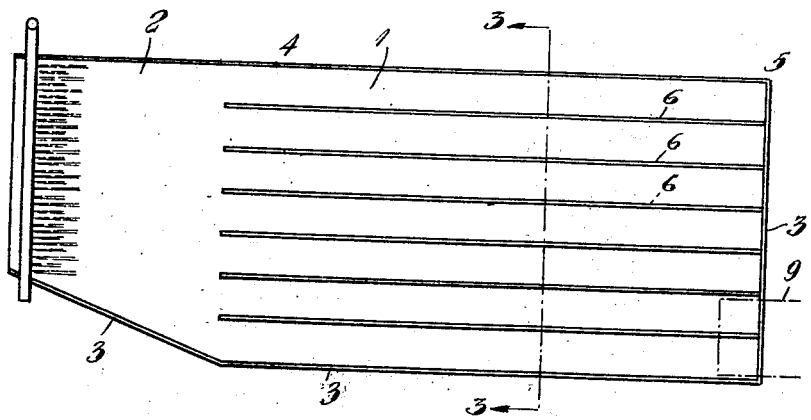
Figure 3:
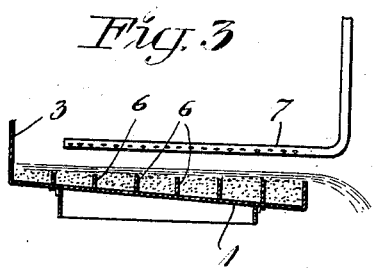

An embodiment of the invention is illustrated in the accompanying drawing. Fig. 1 is a side view of the trough shown in longitudinal section. Fig. 2 is a plan view of the trough, and Fig. 3 a cross-section of the same.

The trough is of a rectangular shape having a beveled portion at the one side of the fore end, and forms two compartments, the bottom of the first compartment 1 is inclined from the rear end, the feeding-in end, in a forward and downward direction toward the compartment 2, the bottom of which latter is sloping toward the fore end (discharge end). The compartment 1 is provided with longitudinal beams 6 paralleling one another, said beams being adapted mutually with respect to their levels in such a manner that all of the upper edges of the beams are situated in the same horizontal plane. The trough is limited on three sides by walls 3, whereas an opening or slot extending between the points 4 and 5 (Fig. 2) is provided on the fourth side, the lower edge of said opening or slot coinciding with the above-mentioned horizontal plane between the upper edges of the beams 6. As will appear from Fig. 3, the trough is inclined toward the opening 4, 5. The suspended material is supplied through a shaft or duct at the supply end or the side of the trough opposite to that of the opening 4, 5. Provided within the range of the discharge end is a conduit 7 for compressed air extending transversely over the trough. The conduit is provided with a series of openings or suitable nozzles, through which the air is pressed in jets obliquely downwards in such a manner as to meet and hit the layer of water which is entrained on the surface of the material packed together in the compartment 2 and discharged from the latter.

The material 1 is spread out from that corner of the trough, where it is supplied through the shaft or duct 9, and the parts of the material which are not entrained with the water will sink down, as stated above, in the compartment 1, and are moved forwards in said compartment by reason of the jolting action. At the same time the water is moved, together with particles of the material entrained therewith, by reason of the sloping position of the trough, mainly in an oblique direction of the board, from the feeding-in point, that is to say, in a direction forming an angle less than 180° with the direction in which the material moves on account of the jolting action. The water is discharged over the lower edge of the opening 4, 5. The water layer which, as stated above, is entrained on the surface of the material conveyed in the compartment 2, is hit by the air jet 8 so as to be driven back, and is then caused to flow off through the opening 4, 5. In this manner, the separation of the water is effected rapidly, and the material discharged at the discharge end is dehydrated as completely as possible.

What we claim is:—

1. A device of the character described including a longitudinally movable table having its upper surface inclined to one side, longitudinally arranged and laterally spaced riffles on said upper surface, said riffles successively increasing in height toward the lower lateral edge of the table to permit the water to flow off at said side but retain the solids by the riffles.

2. A device of the character described including a longitudinally movable table having its upper surface inclined to one side, longitudinally arranged and laterally spaced riffles on said upper surface, said riffles successively increasing in height toward the lower lateral edge of the table to permit the water to flow off at said side but retain the solids by the riffles, said table having a beveled portion at one side of its forward end.

3. A device of the character described including a longitudinally movable table having its upper surface inclined to one side, longitudinally arranged and laterally spaced riffles on said upper surface, said riffles successively increasing in height toward the lower lateral edge of the table to permit the water to flow off at said side but retain the solids by the riffles, said table having a beveled portion at one side of its forward end, and a transverse air supply conduit thereacross having obliquely downwardly directed apertures.

4. A device of the character described including a longitudinally movable table having its upper surface inclined forwardly and to one side, longitudinally arranged and laterally spaced riffles on said upper surface, said riffles successively increasing in height toward the lower lateral edge of the table to permit the water to flow off at said side but retain the solids by the riffles.

5. A device of the character described including a longitudinally movable table having its upper surface inclined forwardly and to one side, longitudinally arranged and laterally spaced riffles on said upper surface, said riffles successively increasing in height toward the lower lateral edge of the table to permit the water to flow off at said side but retain the solids by the riffles, said table having a beveled portion at one side of its forward end.

6. A device of the character described including a longitudinally movable table having its upper surface inclined forwardly and to one side, longitudinally arranged and laterally spaced riffles on said upper surface, said riffles successively increasing in height toward the lower lateral edge of the table to permit the water to flow off at said side but retain the solids by the riffles, and a transverse air supply conduit thereacross having obliquely downwardly directed apertures.

In testimony whereof we affix our signatures.

RAGNAR SALWÉN.
JOHAN ÖHRN.